(12) United States Patent
Theertham et al.

(10) Patent No.: US 11,795,831 B2
(45) Date of Patent: Oct. 24, 2023

(54) MULTI-MATERIAL VANE FOR A GAS TURBINE ENGINE

(71) Applicant: Raytheon Technologies Corporation, Farmington, CT (US)

(72) Inventors: Arun K. Theertham, Rocky Hill, CT (US); Andrew Pope, Glendale, NY (US)

(73) Assignee: RTX CORPORATION, Farmington, CT (US)

(*) Notice: Subject to any disclaimer, the term of this patent is extended or adjusted under 35 U.S.C. 154(b) by 57 days.

(21) Appl. No.: 16/851,911

(22) Filed: Apr. 17, 2020

(65) Prior Publication Data
US 2021/0324752 A1 Oct. 21, 2021

(51) Int. Cl.
*F01D 9/02* (2006.01)
*F01D 25/00* (2006.01)

(52) U.S. Cl.
CPC ............. *F01D 9/02* (2013.01); *F01D 25/005* (2013.01); *F05D 2240/121* (2013.01); *F05D 2240/122* (2013.01); *F05D 2240/123* (2013.01); *F05D 2240/124* (2013.01)

(58) Field of Classification Search
CPC ...... F01D 9/02; F01D 25/005; F05D 2240/10; F05D 2240/121; F05D 2240/122; F05D 2240/123; F05D 2240/124; F05D 2300/10; F05D 2300/20
See application file for complete search history.

(56) References Cited

U.S. PATENT DOCUMENTS

| | | | |
|---|---|---|---|
| 3,002,717 A | 10/1961 | Pavlecka |
| 3,060,561 A | 10/1962 | Watter |
| 3,903,578 A | 9/1975 | Rothman |
| 4,029,838 A | 6/1977 | Chamis |
| 4,118,147 A | 10/1978 | Ellis |
| 4,671,470 A | 6/1987 | Jonas |
| 4,808,485 A | 2/1989 | Prewo |
| 4,885,212 A | 12/1989 | Prewo |
| 4,911,990 A | 3/1990 | Prewo |
| 4,999,256 A | 3/1991 | Prewo |
| 5,015,116 A | 5/1991 | Nardone |
| 5,079,099 A | 1/1992 | Prewo |
| 5,295,789 A | 3/1994 | Daguet |
| 5,366,765 A | 11/1994 | Milaniak |
| 5,370,831 A | 12/1994 | Blair |

(Continued)

OTHER PUBLICATIONS

EP search report for EP2116895.6 dated Nov. 24, 2021.

*Primary Examiner* — Courtney D Heinle
*Assistant Examiner* — Danielle M. Christensen
(74) *Attorney, Agent, or Firm* — Getz Balich LLC (57) ABSTRACT

A multi-material vane is provided for a gas turbine engine. This vane includes an airfoil extending along a chamber line between a leading edge and a trailing edge. The airfoil extends along a span line between an inner end and an outer end. The airfoil extends laterally between a first side and a second side. The airfoil includes a base section, a first side section and a second side section. The base section defines at least a portion of the trailing edge of the airfoil. The base section is laterally between and connected to the first side section and the second side section. The first side section defines at least a portion of the first side of the airfoil. The second side section defines at least a portion of the second side of the airfoil.

19 Claims, 9 Drawing Sheets

(56) References Cited

U.S. PATENT DOCUMENTS

| | | | |
|---|---|---|---|
| 5,407,326 A | 4/1995 | Lardellier | |
| 5,634,771 A | 6/1997 | Howard | |
| 5,692,881 A | 12/1997 | Leibfried | |
| 5,797,239 A | 8/1998 | Zaccone | |
| 5,913,661 A | 6/1999 | Panovsky | |
| 5,931,641 A | 8/1999 | Finn | |
| 5,947,688 A | 9/1999 | Schilling | |
| 6,033,186 A | 3/2000 | Schilling | |
| 6,039,542 A | 3/2000 | Schilling | |
| 6,139,278 A | 10/2000 | Mowbray | |
| 6,287,080 B1 | 9/2001 | Evans | |
| 6,364,616 B1 | 4/2002 | Stevenson | |
| 6,514,046 B1 | 2/2003 | Morrison | |
| 6,739,381 B2 | 5/2004 | Esser | |
| 6,743,504 B1 | 6/2004 | Allen | |
| 6,846,160 B2 * | 1/2005 | Saito | F01D 5/141 |
| | | | 416/190 |
| 7,144,222 B2 | 12/2006 | Lanni | |
| 7,240,718 B2 | 7/2007 | Schmidt | |
| 7,334,997 B2 | 2/2008 | Karafillis | |
| 7,410,342 B2 | 8/2008 | Matheny | |
| 7,508,466 B2 | 3/2009 | Hutchins | |
| 7,766,625 B2 | 8/2010 | Burdgick | |
| 7,794,197 B2 | 9/2010 | Thompson | |
| 7,828,526 B2 * | 11/2010 | Cairo | F04D 29/322 |
| | | | 416/224 |
| 7,841,730 B2 | 11/2010 | Hara | |
| 7,845,841 B2 | 12/2010 | Sampsell | |
| 7,942,639 B2 | 5/2011 | Burdgick | |
| 7,955,054 B2 | 6/2011 | El-Aini | |
| 7,969,532 B2 | 6/2011 | Mizushima | |
| 8,009,243 B2 | 8/2011 | Chen | |
| 8,083,489 B2 | 12/2011 | Viens | |
| 8,585,268 B2 | 11/2013 | Yankov | |
| 8,821,124 B2 | 9/2014 | Viens | |
| 10,711,624 B2 * | 7/2020 | Devore | F04D 29/5853 |
| 2005/0247818 A1 | 11/2005 | Prichard | |
| 2005/0249601 A1 | 11/2005 | Burdgick | |
| 2007/0292274 A1 | 12/2007 | Burdgick | |
| 2008/0072569 A1 | 3/2008 | Moniz | |
| 2008/0159856 A1 | 7/2008 | Moniz | |
| 2008/0253885 A1 | 10/2008 | Foose | |
| 2008/0259247 A1 | 10/2008 | Stuart | |
| 2009/0317238 A1 * | 12/2009 | Wood | F01D 25/162 |
| | | | 415/119 |
| 2010/0129651 A1 | 5/2010 | Schreiber | |
| 2010/0209235 A1 * | 8/2010 | Shim | F04D 29/542 |
| | | | 415/200 |
| 2011/0026270 A1 | 2/2011 | Onishi | |
| 2011/0070092 A1 | 3/2011 | Gerlach | |
| 2011/0194307 A1 | 8/2011 | Chen | |
| 2011/0199559 A1 | 8/2011 | Nakamura | |
| 2011/0199670 A1 | 8/2011 | Chen | |
| 2011/0199786 A1 | 8/2011 | Uchida | |
| 2011/0205453 A1 | 8/2011 | Kasai | |
| 2011/0205756 A1 | 8/2011 | Kim | |
| 2011/0211368 A1 | 9/2011 | Mishima | |
| 2013/0121833 A1 | 5/2013 | Lucashu | |
| 2013/0251519 A1 * | 9/2013 | Dunleavy | F04D 29/542 |
| | | | 415/208.1 |
| 2014/0010662 A1 | 1/2014 | Duelm | |
| 2017/0292531 A1 * | 10/2017 | Snyder | F04D 29/584 |
| 2018/0135439 A1 * | 5/2018 | Devore | F01D 25/08 |
| 2020/0040742 A1 | 2/2020 | Fromonteil | |

\* cited by examiner

MULTI-MATERIAL VANE FOR A GAS TURBINE ENGINE

BACKGROUND OF THE DISCLOSURE

1. Technical Field

This disclosure relates generally to a gas turbine engine and, more particularly, to a vane/vane assembly for a gas turbine engine.

2. Background Information

Various types and configurations of vanes, such as structural guide vanes for a gas turbine engine, are known in the art. While these known vanes have various benefits, there is still room in the art for improvement. For example, there is a need in the art for a light weight structural guide vane which is relatively simple to manufacture.

SUMMARY OF THE DISCLOSURE

According to an aspect of the present disclosure, a vane is provided for a gas turbine engine. This vane includes an airfoil extending along a chamber line between a leading edge and a trailing edge. The airfoil extends along a span line between an inner end and an outer end. The airfoil extends laterally between a first side and a second side. The airfoil includes a base section, a first side section and a second side section. The base section defines at least a portion of the trailing edge of the airfoil. The base section is laterally between and connected to the first side section and the second side section. The base section is configured from or otherwise includes metal material. The first side section defines at least a portion of the first side of the airfoil. The first side section is configured from or otherwise includes first non-metal material. The second side section defines at least a portion of the second side of the airfoil. The second side section is configured from or otherwise includes second non-metal material.

According to another aspect of the present disclosure, another vane is provided for a gas turbine engine. This vane includes an airfoil extending longitudinally between a leading edge and a trailing edge. The airfoil extends spanwise between an inner end and an outer end. The airfoil extends laterally between a first side and a second side. The airfoil includes a base section, a first side section and a second side section. The base section laterally separates and is bonded to the first side section and the second side section. The base section is configured from or otherwise includes metal material. The first side section defines at least a portion of the first side of the airfoil. The first side section is configured from or otherwise includes first non-metal material. The second side section defines at least a portion of the second side of the airfoil. The second side section is configured from or otherwise includes second non-metal material. The second side section is physically discrete from the first side section.

According to still another aspect of the present disclosure, still another vane is provided for a gas turbine engine. This vane includes an airfoil extending longitudinally between a leading edge and a trailing edge. The airfoil extends spanwise between an inner end and an outer end. The airfoil extends laterally between a first side and a second side. The airfoil includes a base section, a first side section and a second side section. The base section is configured from or otherwise includes metal material. The base section is laterally between the first side section and the second side section. The base section is configured as an aperture free body at least between the first side section and the second side section. The first side section defines at least a portion of the first side of the airfoil. The first side section is configured from or otherwise includes first composite material. The second side section defines at least a portion of the second side of the airfoil. The second side section is configured from or otherwise includes second composite material.

The base section may at least partially define the leading edge of the airfoil.

The base section may at least partially define the trailing edge of the airfoil.

The base section may also define at least a portion of the leading edge of the airfoil.

The first side section may be seated within a first pocket in the base section.

The second side section may be seated within a second pocket in the base section.

The base section may have an I-beam configuration.

The base section may define an entirety of the trailing edge of the airfoil.

The base section may define an entirety of the leading edge of the airfoil.

The base section may laterally separate the first side section from the second side section.

The airfoil may have a span length extending along the span line between the inner end and the outer end of the airfoil. An end-to-end length of the first side section along the span line may be less than the span length.

The airfoil may have an inner end portion at the inner end. The airfoil may have an outer end portion at the outer end. The airfoil may have an intermediate portion extending along the span line between the inner end portion and the outer end portion. At least the base section, the first side section and the second side section may collectively form the intermediate portion. At least the base section may form the inner end portion and/or the outer end portion.

The first side section may not form the inner end portion and/or the outer end portion. In addition or alternatively, the second side section may not form the inner end portion and/or the outer end portion.

The first side section may abut against the base section in a spanwise direction. In addition or alternatively, the second side section may abut against the base section in the spanwise direction.

The base section may have a first portion and a second portion aligned along the chamber line. The first portion may be between the second portion and one of the inner end and the outer end along the span line. The first portion may have a first lateral thickness. The second portion may have a second lateral thickness that is less than the first lateral thickness. The first side section and/or the second side section may overlap and may be connected to the first portion and the second portion.

The vane may also include an inner platform and an outer platform. The airfoil may extend along the span line between and may be connected to the inner platform and the outer platform.

The first non-metal material may be or otherwise include fiber-reinforced composite material. In addition or alternatively, the second non-metal material may be or otherwise include fiber-reinforced composite material.

The vane may be configured as a structural guide vane of the gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
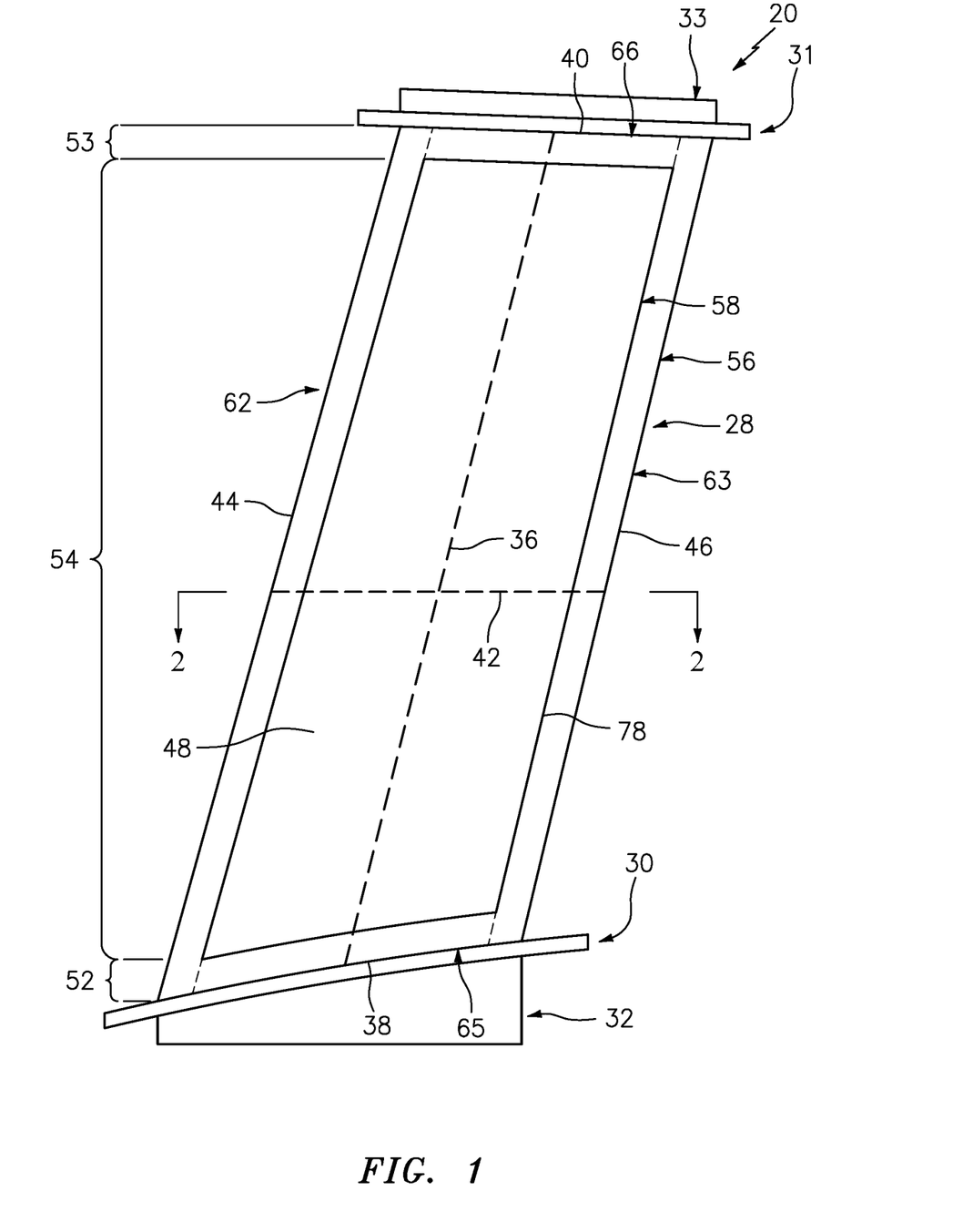
FIG. 1 is an illustration of a first side of a vane for a gas turbine engine.
Figure 2:
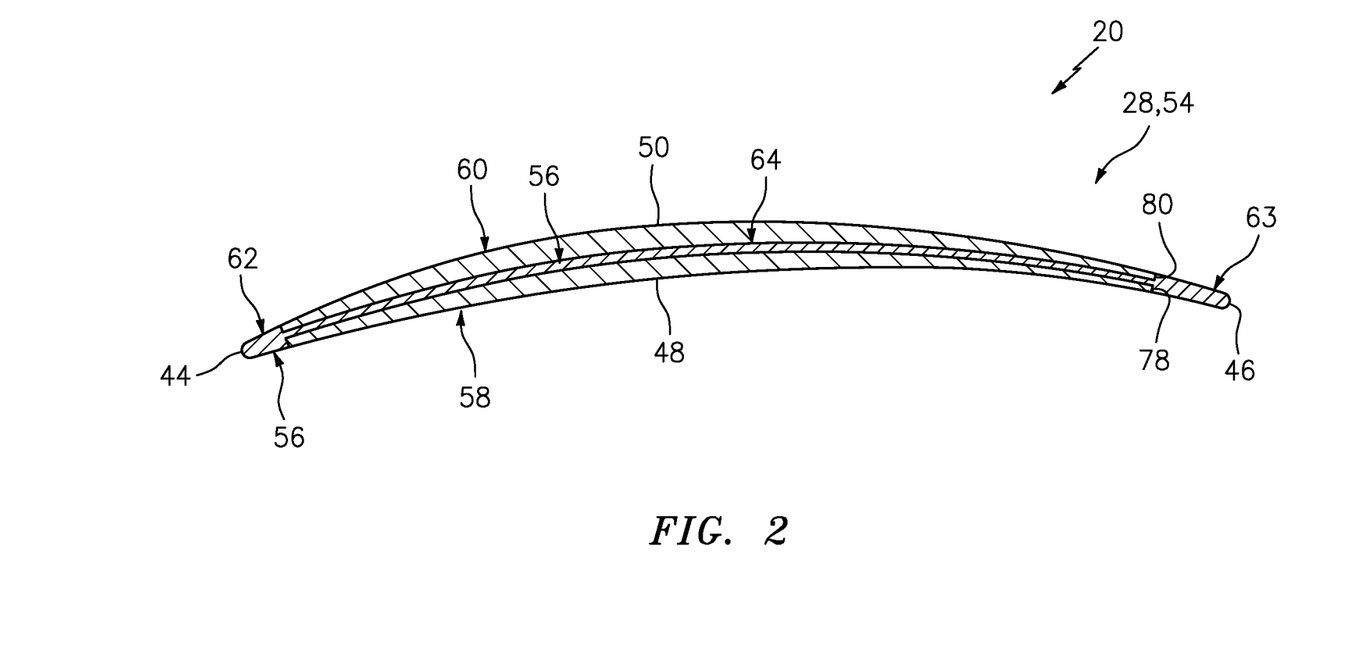
FIG. 2 is a cross-sectional illustration of the vane taken along line 2-2 in FIG. 1.

FIGS. 1 and 2 illustrate a multi-material vane 20 (e.g., a metal-composite vane) for a gas turbine engine. This vane 20 may be configured as a structural guide vane; e.g., a structural exit guide vane. For example, referring to FIG. 3, the vane 20 may extend between and be structurally tied to an inner structure 22 of the gas turbine engine and an outer structure 24 of the gas turbine engine. With such a configuration, the vane 20 is configured to transfer loads between the inner structure 22 and the outer structure 24. The vane 20 may also or alternatively be configured to direct flow within a flowpath 26 (e.g., a bypass flowpath) of the gas turbine engine. The vane 20 of the present disclosure, however, is not limited to such an exemplary vane configuration or arrangement within the gas turbine engine.

Referring to FIG. 1, the vane 20 includes a vane airfoil 28, a vane inner platform 30 (e.g., a shroud segment) and a vane outer platform 31 (e.g., a shroud segment). The vane 20 of FIG. 1 also include a vane inner mount 32 and a vane outer mount 33. Of course, it is contemplated the vane 20 may alternatively be configured without one or more of the vane elements 30-33 and/or include one or more additional elements. For example, in some embodiments, the inner platform 30 and/or the outer platform 31 may be configured discrete from the vane 20.

The vane airfoil 28 of FIG. 1 extends spanwise along a span line 36 between an airfoil inner end 38 and an airfoil outer end 40, where the airfoil outer end 40 is positioned radially outboard of the airfoil inner end 38. The vane airfoil 28 extends longitudinally along a camber line 42 between an (e.g., forward, upstream) airfoil leading edge 44 and an (e.g., aft, downstream) airfoil trailing edge 46. Referring to FIG. 2, the vane airfoil 28 extends laterally (e.g., widthwise) between an (e.g., pressure, concave) airfoil first side 48 and an (e.g., suction, convex) airfoil second side 50. Referring to FIGS. 1 and 2, each of these vane airfoil elements 44, 46, 48 and 50 extends between and to the airfoil inner end 38 and the airfoil outer end 40.

Referring to FIG. 1, the vane airfoil 28 has an airfoil inner end portion 52, an airfoil outer end portion 53 and an airfoil intermediate portion 54. Each of these portions 52-54 defines a respective part of the airfoil elements 44, 46, 48 and 50; see also FIG. 2. The intermediate portion 54 extends spanwise between and to the inner end portion 52 and the outer end portion 53. The inner end portion 52 is arranged at the airfoil inner end 38, and is connected to the vane inner platform 30. The outer end portion 53 is arranged at the airfoil outer end 40, and is connected to the vane outer platform 31.

Figure 3:
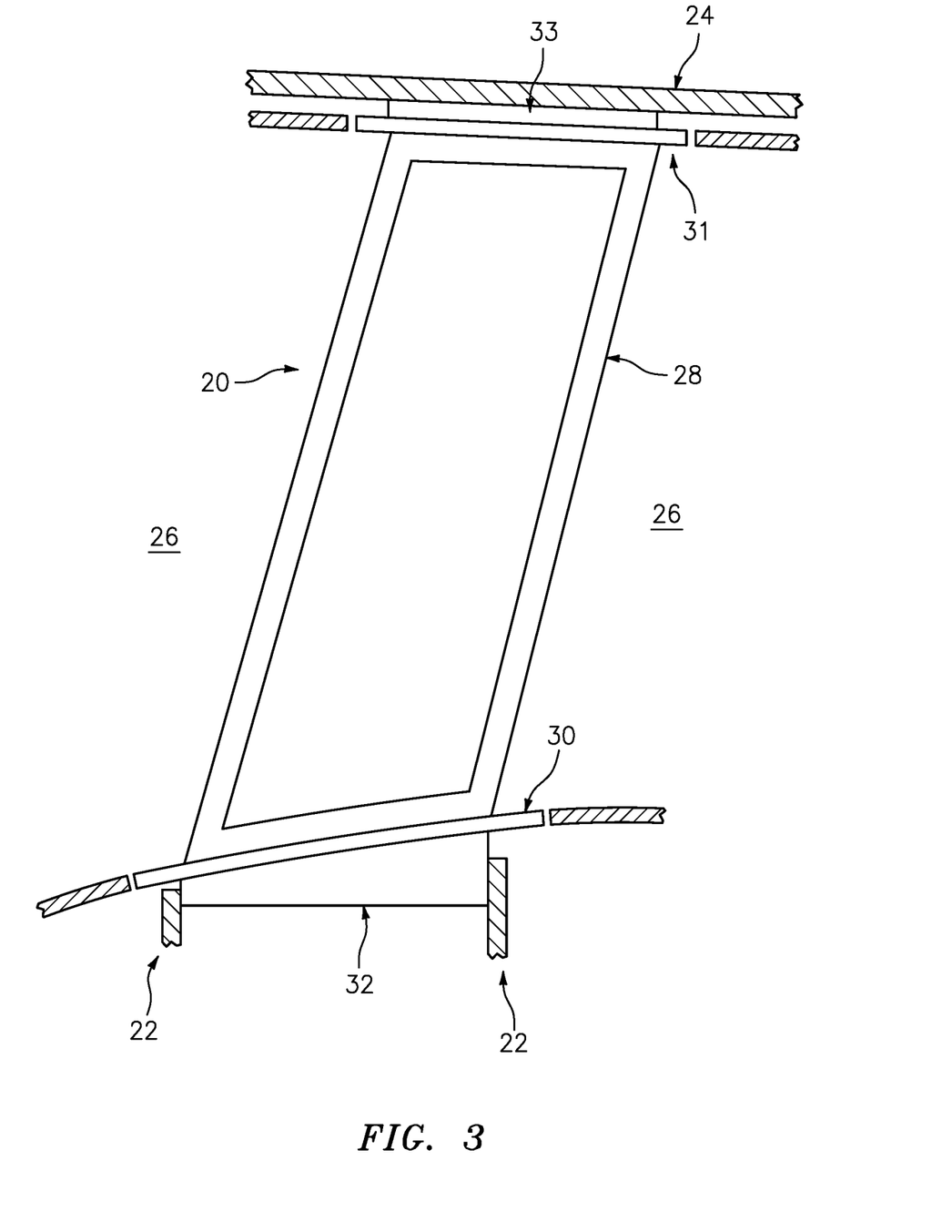
FIG. 3 is a side sectional illustration of a portion of an assembly that includes an array of the vanes (one visible in FIG. 3).

Referring to FIG. 3, the vane inner platform 30 is configured to form an inner peripheral portion of the flowpath 26. The vane outer platform 31 is positioned radially outboard of the vane inner platform 30. The vane outer platform 31 is configured to form an outer peripheral portion of the flowpath 26.

The vane inner mount 32 is configured to attach and structurally tie the vane 20 to the inner structure 22. The vane outer mount 33 is configured to attach and structurally tie the vane 20 to the outer structure 24. Referring to FIG. 1, the vane inner mount 32 is positioned radially inboard of and connected to the vane inner platform 30. The vane outer mount 33 is position radially outboard of and connected to the vane outer platform 31.

The vane airfoil 28 of FIGS. 1 and 2 is configured as a multi-material (e.g., bi-material) airfoil; e.g., a metallic-composite hybrid airfoil. The vane airfoil 28 of FIGS. 1 and 2, for example, includes an airfoil base section 56, an airfoil first side section 58 and an airfoil section side section 60. The base section 56 may be constructed from or otherwise base section material. An example of the base section material is metal such as, but not limited to, steel, titanium (Ti), aluminum (Al), nickel (Ni) or alloys thereof. The first side section 58 may be constructed from or otherwise include first side section non-metal material. The second side section 60 may be constructed from or otherwise include second side section non-metal material, which second side section non-metal material may be the same or different than the first side section non-metal material. Examples of the first and the second side section non-metal materials include, but are not limited to, composite materials (e.g., materials including fiber-reinforcement within a polymer matrix, such as carbon fiber and/or fiberglass within a thermoset or thermoplastic matrix).

Figure 4:
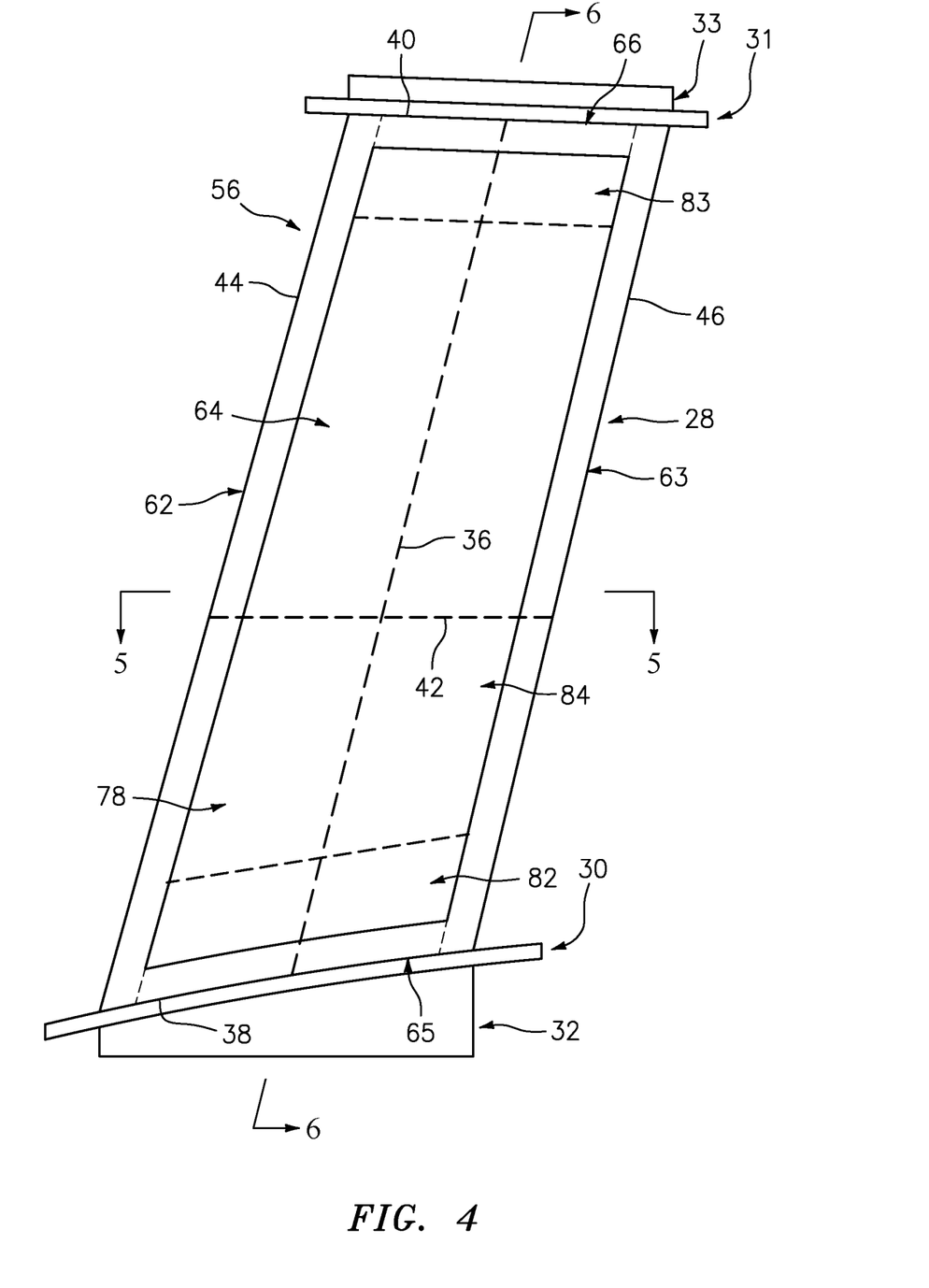
FIG. 4 is an illustration of a first side of the vane without first and second side sections.

Referring to FIG. 4, the base section 56 of the vane airfoil 28 may be configured integrally with one or more or each of the other vane components 30-33. The vane components 28 and 30-33 of FIG. 4, for example, are configured together as a monolithic metal body. The vane components 28 and 30-33, for example, may be cast, machined, additively manufactured or otherwise formed as a single body of material. The present disclosure, however, is not limited to such an exemplary monolithic metal body embodiment.

Figure 5:
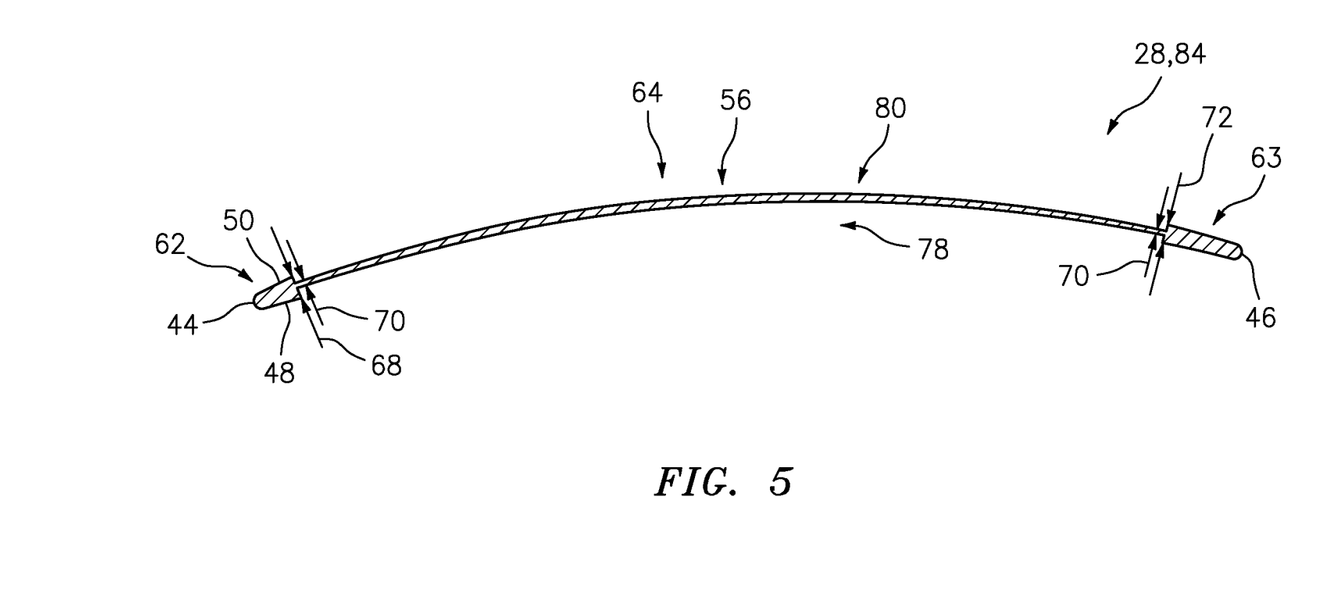
FIG. 5 is a cross-sectional illustration of the FIG. 4 body taken along line 5-5 in FIG. 4.

Referring to FIG. 5, the base section 56 may have an I-beam configuration; e.g., an I-beam cross-sectional geometry when viewed, for example, in a plane perpendicular to the span line 36. The base section 56 of FIGS. 4 and 5, for example, includes a leading edge segment 62, a trailing edge segment 63 and an intermediate segment 64 where the edge segments 62 and 63 represent flange portions of the I-beam configuration and the intermediate segment 64 represents a web portion of the I-beam configuration. The base section 56 of FIG. 4 also includes an inner end segment 65 and an outer end segment 66 which cap ends of the intermediate segment 64, where each segment 64-66 forms a respective spanwise section of the base section 56.

The leading edge segment 62 extends along and at least partially (e.g., completely) defines the airfoil leading edge 44. The leading edge segment 62 also partially defines a (e.g., forward, upstream) first portion of the airfoil first side 48 and/or a (e.g., forward, upstream) first portion of the airfoil second side 50, where the first portions meet at the airfoil leading edge 44 and extend longitudinally towards the airfoil trailing edge 46 as well as extend spanwise between the airfoil ends 38 and 40.

The trailing edge segment 63 extends along and at least partially (e.g., completely) defines the airfoil trailing edge 46. The trailing edge segment 63 also partially defines a (e.g., aft, downstream) second portion of the airfoil first side 48 and/or a (e.g., aft, downstream) second portion of the airfoil second side 50, where the second portions meet at the airfoil trailing edge 46 and extend longitudinally towards the airfoil leading edge 44 as well as extend spanwise between the airfoil ends 38 and 40.

The intermediate segment 64 extends longitudinally between and is connected to the leading edge segment 62 and the trailing edge segment 63. The intermediate segment 64 extends spanwise between and is connected to the inner end segment 65 and the outer end segment 66.

Referring to FIG. 5, at an interface between the leading edge segment 62 and the intermediate segment 64, the leading edge segment 62 has a lateral width 68 that is greater than a lateral width 70 of the intermediate segment 64. At an interface between the trailing edge segment 63 and the intermediate segment 64, the trailing edge segment 63 has a lateral width 72 that is greater than the lateral width 70 of the intermediate segment 64. Similarly, referring to FIG. 6, at an interface between the inner end segment 65 and the intermediate segment 64, the inner end segment 65 has a lateral width 74 that is greater than the lateral width 70 of the intermediate segment 64. At an interface between the outer end segment 66 and the intermediate segment 64, the outer end segment 66 has a lateral width 76 that is greater than the lateral width 70 of the intermediate segment 64.

With the foregoing configuration, the base section 56 is configured with one or more pockets 78 and 80; e.g., recesses. The first pocket 78 is disposed at the airfoil first side 48 (see FIG. 2) and projects partially into the base section 56 to the intermediate segment 64. The second pocket 80 is disposed at the airfoil second side 50 (see FIG. 2) and projects partially into the base section 56 to the intermediate segment 64. The intermediate segment 64, however, (e.g., completely) laterally separates the first pocket 78 form the second pocket 80. The intermediate segment 64 of FIG. 4 and, more particularly, the entire base section 56, for example, is configured as an aperture free body. The first pocket 78 and the second pocket 80 may thereby be (e.g., completely) discrete from one another.

Figure 6:
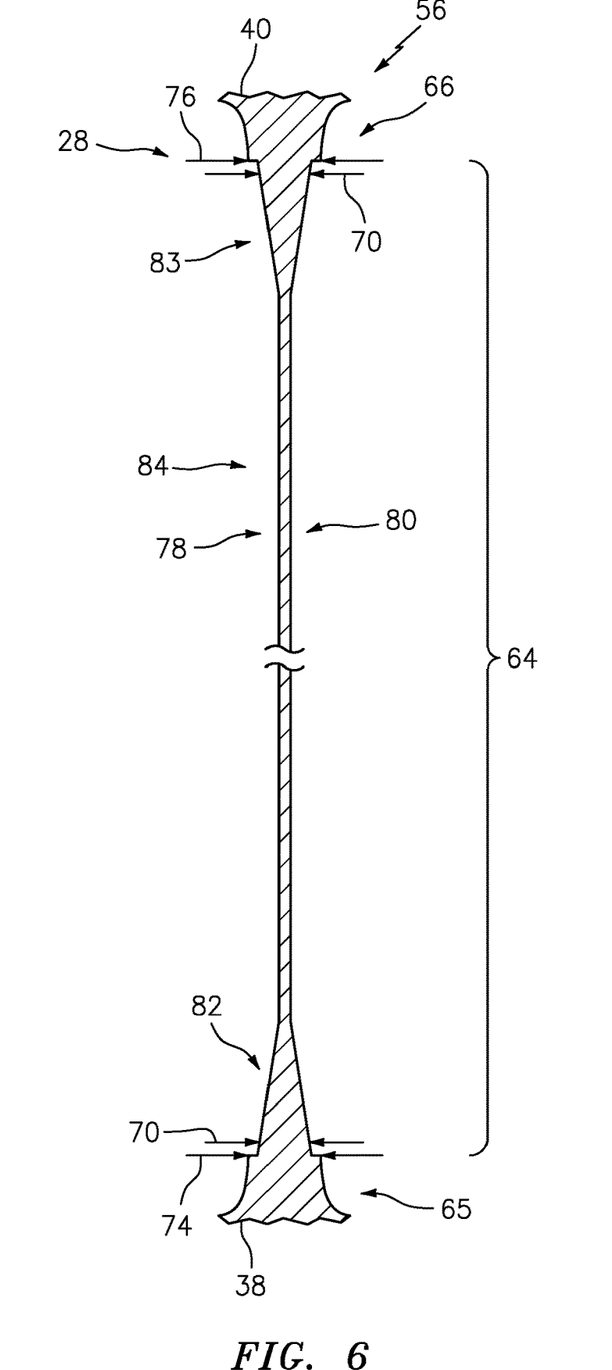
FIG. 6 is a sectional illustration of the FIG. 4 body taken along line 6-6 in FIG. 4.
Figure 7:
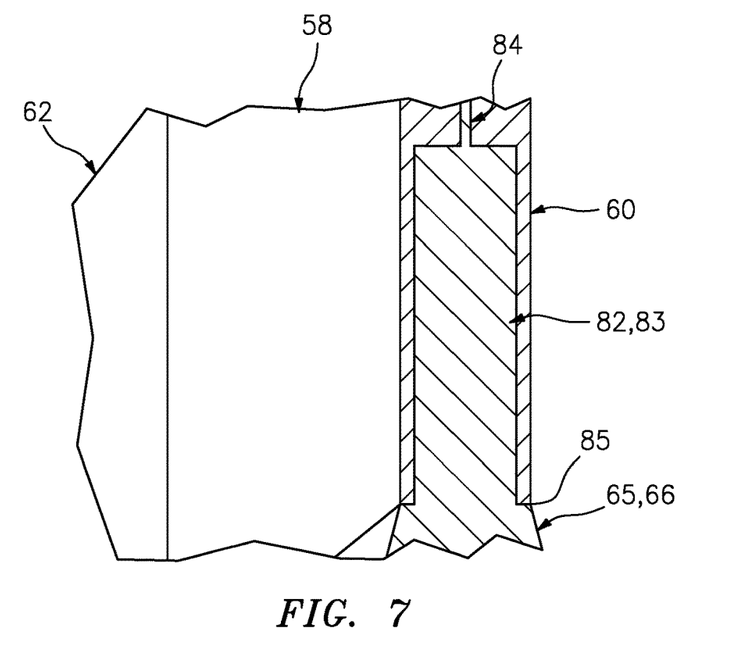
FIG. 7 is a perspective sectional illustration depicting a portion of an interface between an airfoil base section and the first and the second side sections.
Figure 8:
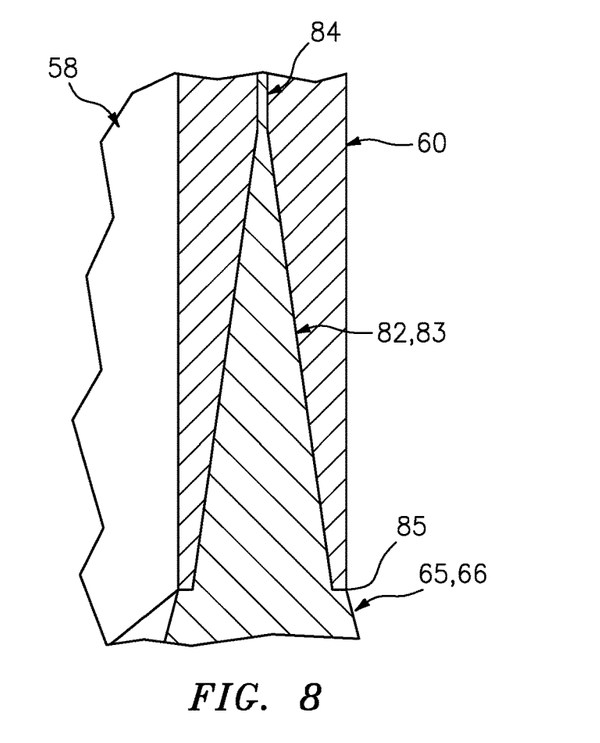
FIG. 8 is a perspective sectional illustration depicting a portion of another interface between the airfoil base section and the first and the second side sections.

The intermediate segment 64 of FIG. 4 (e.g., a spanwise section of the base section 56) includes an inner portion 82, an outer portion 83 and an intermediate portion 84. These portions 82-84 are longitudinally aligned along the camber line 42. The intermediation portion 84 extends spanwise between and to the inner portion 82 and the outer portion 83. Referring to FIG. 6, the inner portion 82 provides a lateral width transition between the inner end segment 65 and the intermediation portion 84 of the intermediate segment 64. Similarly, the outer portion 83 provides a lateral width transition between the outer end segment 66 and the intermediation portion 84 of the intermediate segment 64. For example, referring to FIG. 7, one or each portion 82, 83 may be configured to provide a stepped transition (e.g., a lateral step 85) where a lateral width of the portion 82, 83 is less than a lateral width of the end segment 65, 66 and greater than a lateral width of the intermediation portion 84. Referring to FIG. 8, one or each portion 82, 83 may alternatively be configured as a tapered transition where a lateral width of the portion 82, 83 (e.g., smoothly, continuously and/or otherwise) tapers down from the lateral width of the end segment 65, 66 to the lateral width of the intermediation portion 84. The present disclosure, however, is not limited to including such transitions.

Referring to FIGS. 1 and 2, the first side section 58 is seated within the first pocket 78 and connected (e.g., bonded and/or otherwise attached) to the base section 56 and its intermediate segment 64. The first side section 58 extends longitudinally between and longitudinally abuts the leading edge segment 62 and the trailing edge segment 63. The first side section 58 extends spanwise between and spanwise abuts the inner end segment 65 and the outer end segment 66. The first side section 58 along with the base section segments 62, 63, 65 and 66 are configured to collectively form the airfoil first side 48 and an exterior flow surface of the airfoil 28 at that first side 48. Thus, the base section 56 and the first side section 58 collectively form the intermediation portion 84 of the airfoil 28 at its first side 48. However, the base section 56 alone may form one or both of the end portions 52, 53 of the airfoil 28 at its first side 48.

The second side section 60 is seated within the second pocket 80 and connected (e.g., bonded and/or otherwise attached) to the base section 56. The second side section 60 extends longitudinally between and longitudinally abuts the leading edge segment 62 and the trailing edge segment 63. The second side section 60 extends spanwise between and spanwise abuts the inner end segment 65 and the outer end segment 66. The second side section 60 along with the base section segments 62, 63, 65 and 66 are configured to collectively form the airfoil second side 50 and an exterior flow surface of the airfoil 28 at that second side 50. Thus, the base section 56 and the second side section 60 collectively form the intermediation portion 84 of the airfoil 28 at its second side 50. However, the base section 56 alone may form one or both of the end portions 52, 53 of the airfoil 28 at its second side 50.

Referring to FIG. 2, since the intermediate segment 64 is aperture free (e.g., solid), the base section 56 and its intermediate segment 64 (e.g., completely) separate the first side section 58 from the second side section 60. This separation may facilitate a relatively low complexity manufacturing process. For example, the first pocket 78 may first be (e.g., completely) filled with the first non-metal material to form the first side section 58. The body may then be flipped over and the second pocket 80 may then be (e.g., completely) filled with the second non-metal material to form the second side section 60, or vice versa. The present disclosure, however, is not limited to any particular manufacturing techniques or steps.

Figure 9:
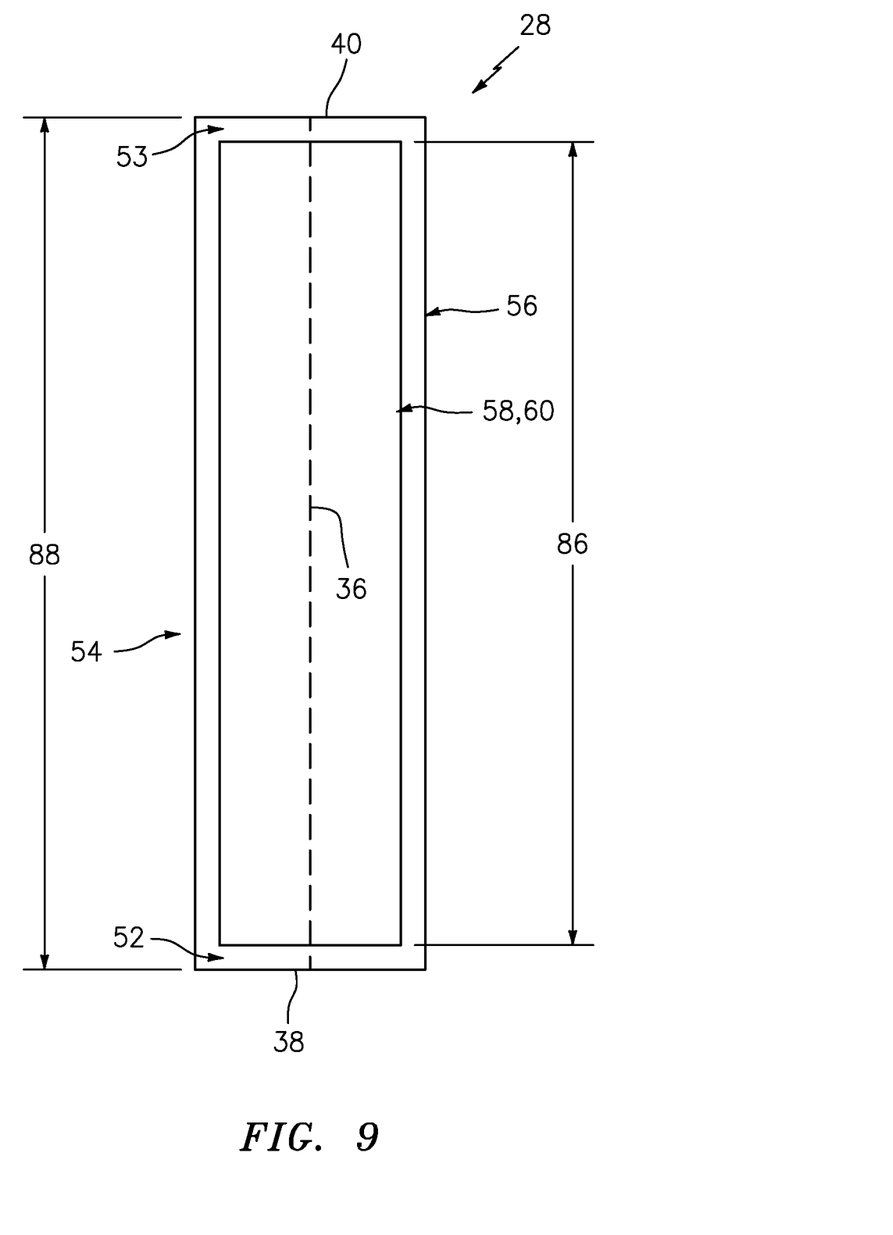
FIG. 9 is a schematic illustration of the vane.

Referring to FIG. 9, each side section 58, 60 has an end-to-end length 86 along the span line 36. Each airfoil 28 has an end-to-end length 88 (e.g., vane height) along the span line 36. The side section length 86 may be less than the airfoil length 88 due to, for example, provision of the end portions 52 and 53.

Figure 10:
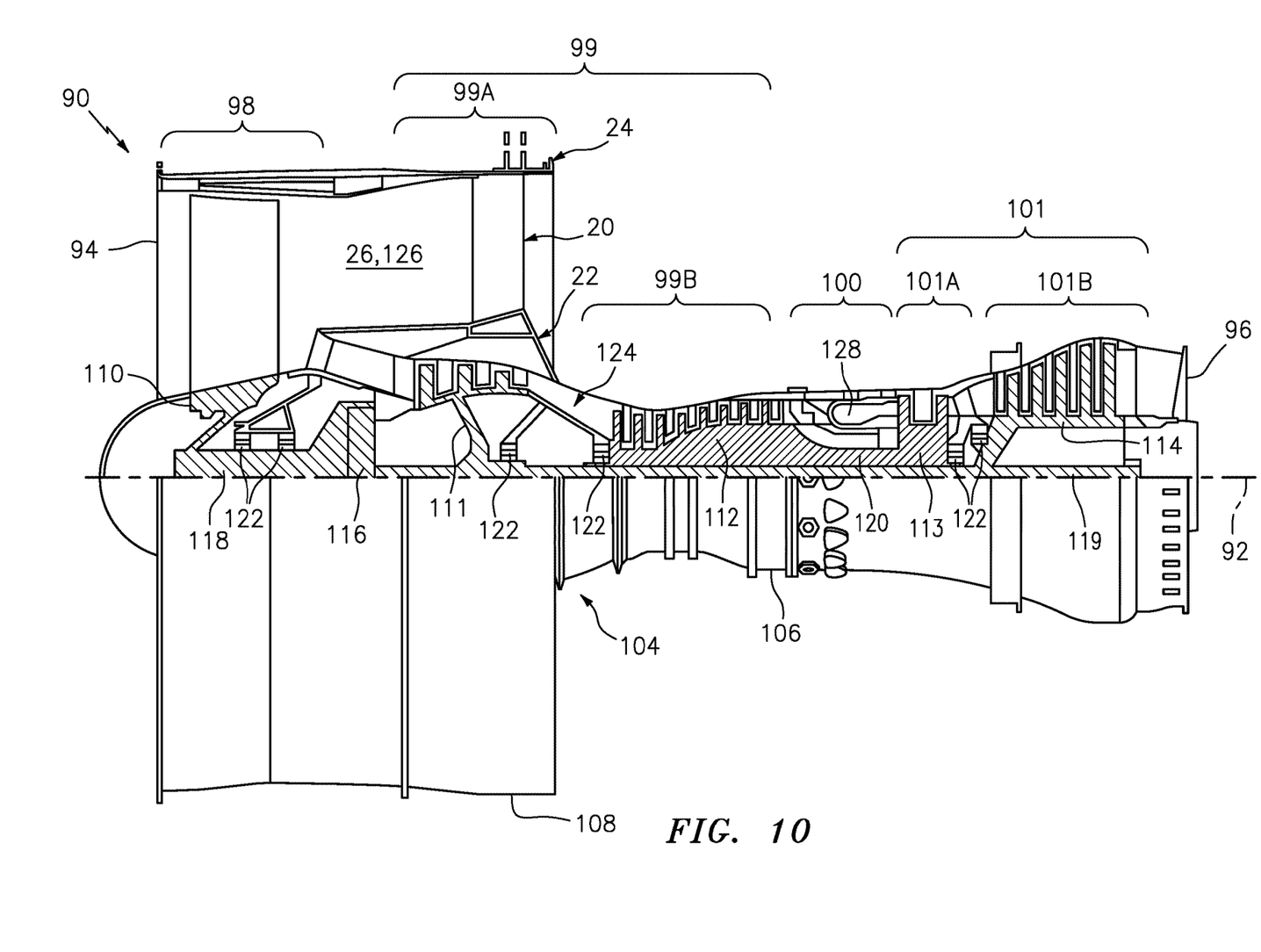
FIG. 10 is a side cutaway illustration of a gas turbine engine configured with a plurality of the vanes (one visible in FIG. 10).

FIG. 10 is a side cutaway illustration of a geared turbine engine 90 which may be configured with one or more (e.g., a circumferential array) of the vanes 20. This turbine engine 90 extends along an axial centerline 92 between an upstream airflow inlet 94 and a downstream airflow exhaust 96. The turbine engine 90 includes a fan section 98, a compressor section 99, a combustor section 100 and a turbine section 101. The compressor section 99 includes a low pressure compressor (LPC) section 99A and a high pressure compressor (HPC) section 99B. The turbine section 101 includes a high pressure turbine (HPT) section 101A and a low pressure turbine (LPT) section 101B.

The engine sections 98-101B are arranged sequentially along the centerline 92 within an engine housing 104. This housing 104 includes an inner case 106 (e.g., a core case) and an outer case 108 (e.g., a fan case). The inner case 106 may house one or more of the engine sections 99A-101B; e.g., an engine core. The inner case 106 is configured with, includes or is part of the inner structure 22. The outer case 108 may house at least the fan section 98. The outer case 108 is configured with, includes or is part of the outer structure 24.

Each of the engine sections 98, 99A, 99B, 101A and 101B includes a respective rotor 110-114. Each of these rotors 110-114 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 110 is connected to a gear train 116, for example, through a fan shaft 118. The gear train 116 and the LPC rotor 111 are connected to and driven by the LPT rotor 114 through a low speed shaft 119. The HPC rotor 112 is connected to and driven by the HPT rotor 113 through a high speed shaft 120. The shafts 118-120 are rotatably supported by a plurality of bearings 122; e.g., rolling element and/or thrust bearings. Each of these bearings 122 is connected to the engine housing 104 by at least one stationary structure such as, for example, an annular support strut.

During operation, air enters the turbine engine 90 through the airflow inlet 94. This air is directed through the fan section 98 and into a core flowpath 124 and a bypass flowpath (e.g., the flowpath 26 of FIG. 3). The core flowpath 124 extends sequentially through the engine sections 99A-101B. The air within the core flowpath 124 may be referred to as "core air". The bypass flowpath 126 extends through a bypass duct, which bypasses the engine core. The air within the bypass flowpath 126 may be referred to as "bypass air".

The core air is compressed by the compressor rotors 111 and 112 and directed into a combustion chamber 128 of a combustor in the combustor section 100. Fuel is injected into the combustion chamber 128 and mixed with the compressed core air to provide a fuel-air mixture. This fuel air mixture is ignited and combustion products thereof flow through and sequentially cause the turbine rotors 113 and 114 to rotate. The rotation of the turbine rotors 113 and 114 respectively drive rotation of the compressor rotors 112 and 111 and, thus, compression of the air received from a core airflow inlet. The rotation of the turbine rotor 114 also drives rotation of the fan rotor 110, which propels bypass air through and out of the bypass flowpath 126. The propulsion of the bypass air may account for a majority of thrust generated by the turbine engine 90, e.g., more than seventy-five percent (75%) of engine thrust. The turbine engine 90 of the present disclosure, however, is not limited to the foregoing exemplary thrust ratio.

The vane 20/an assembly including the vane 20 may be included in various turbine engines other than the one described above. The vane 20, for example, may be included in a geared turbine engine where a gear train connects one or more shafts to one or more rotors in a fan section, a compressor section and/or any other engine section. Alternatively, the vane 20 may be included in a turbine engine configured without a gear train. The vane 20 may be included in a geared or non-geared turbine engine configured with a single spool, with two spools (e.g., see FIG. 10), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A vane for a gas turbine engine, comprising:
   an airfoil extending along a camber line between a leading edge and a trailing edge, the airfoil extending along a span line between an inner end and an outer end, the airfoil extending laterally between a first side and a second side, and the airfoil including a base section, a first side section and a second side section;
   the base section defining at least a portion of the trailing edge of the airfoil, the base section laterally between and connected to the first side section and the second side section, and the base section comprising metal material;
   the first side section defining at least a portion of the first side of the airfoil, and the first side section comprising first non-metal material;
   the second side section defining at least a portion of the second side of the airfoil, and the second side section comprising second non-metal material;
   the base section including a first portion and a second portion aligned along the camber line;
   the first portion between the second portion and one of the inner end and the outer end along the span line;
   the first portion having a first lateral thickness at a first location laterally between the first side section and the second side section;
   the second portion having a second lateral thickness at a second location laterally between the first side section and the second side section, the second lateral thickness less than the first lateral thickness, and the second location aligned with the first location along the camber line;
   the base section configured with a lateral step at a point along the span line where the first portion meets the second portion; and
   at least one of the first side section or the second side section overlapping the first portion and the second portion; and
   connected to the first portion and the second portion.

2. The vane of claim 1, wherein the base section further defines at least a portion of the leading edge of the airfoil.

3. The vane of claim 1, wherein the first side section is seated within a first pocket in the base section.

4. The vane of claim 3, wherein the second side section is seated within a second pocket in the base section.

5. The vane of claim 1, wherein the base section has an I-beam configuration.

6. The vane of claim 1, wherein the base section defines an entirety of the trailing edge of the airfoil.

7. The vane of claim 1, wherein the base section defines an entirety of the leading edge of the airfoil.

8. The vane of claim 1, wherein the base section laterally separates the first side section from the second side section.

9. The vane of claim 1, wherein
the airfoil has a span length extending along the span line between the inner end and the outer end of the airfoil; and
an end-to-end length of the first side section along the span line is less than the span length.

10. The vane of claim 1, wherein
the airfoil has an inner end portion at the inner end, an outer end portion at the outer end and an intermediate portion extending along the span line between the inner end portion and the outer end portion;
at least the base section, the first side section and the second side section collectively form the intermediate portion; and
at least the base section forms at least one of the inner end portion or the outer end portion.

11. The vane of claim 10, wherein neither the first side section nor the second side section forms at least one of the inner end portion or the outer end portion.

12. The vane of claim 1, wherein at least one of
the first side section abuts against the base section in a spanwise direction; or
the second side section abuts against the base section in the spanwise direction.

13. The vane of claim 1, further comprising:
an inner platform; and
an outer platform;
the airfoil extending along the span line between and connected to the inner platform and the outer platform.

14. The vane of claim 1, wherein at least one of the first non-metal material or the second non-metal material comprises fiber-reinforced composite material.

15. The vane of claim 1, wherein
the first side section laterally contacts the first portion and the second portion; and
the second side section laterally contacts the first portion and the second portion.

16. The vane of claim 1, wherein a section of the base section between the first side section and the second side section laterally tapers as the first portion extends along the span line to the second portion.

17. The vane of claim 1, wherein the first lateral thickness and the second lateral thickness are measured at an intersection between the first portion and the second portion.

18. The vane of claim 1, wherein
the base section further includes a third portion aligned along the camber line with the first portion and the second portion;
the first portion extends along the span line from the third portion to the second portion;
the third portion partially defines at least one of the first side and the second side, the third portion has a third lateral width at a third location, the third lateral thickness is greater than the first lateral width, and the third location is aligned with the first location and the second location along the camber line.

19. A vane for a gas turbine engine, comprising:
an airfoil extending longitudinally between a leading edge and a trailing edge, the airfoil extending spanwise along a span line between an inner end and an outer end, the airfoil extending laterally between a first side and a second side, and the airfoil including a base section, a first side section and a second side section;
the base section comprising metal material, and the base section laterally between the first side section and the second side section, wherein the base section is configured as an aperture free body at least between the first side section and the second side section;
the first side section defining at least a portion of the first side of the airfoil, and the first side section comprising first composite material;
the second side section defining at least a portion of the second side of the airfoil, and the second side section comprising second composite material;
the base section including a first section and a second section extending spanwise to the first section;
the first section partially forming the first side and the second side, and the first section abutted spanwise against an end of the first side section and an end of the second side section;
the second section spanwise and longitudinally covered by the first side section and the second side section, the second section including a first portion and a second portion;
the first portion extending spanwise from the first section to the second portion, and the first portion having a first portion lateral thickness that is greater than a second portion lateral thickness of the second portion and that is less than a first section lateral thickness of the first section when viewed in a plane parallel with the span line; and
the base section configured with a lateral step at a point along the span line where the first portion meets the first section.

* * * * *